(No Model.)
E. F. ROBERTSON.
INSECT EXTERMINATOR.
No. 599,404. Patented Feb. 22, 1898.
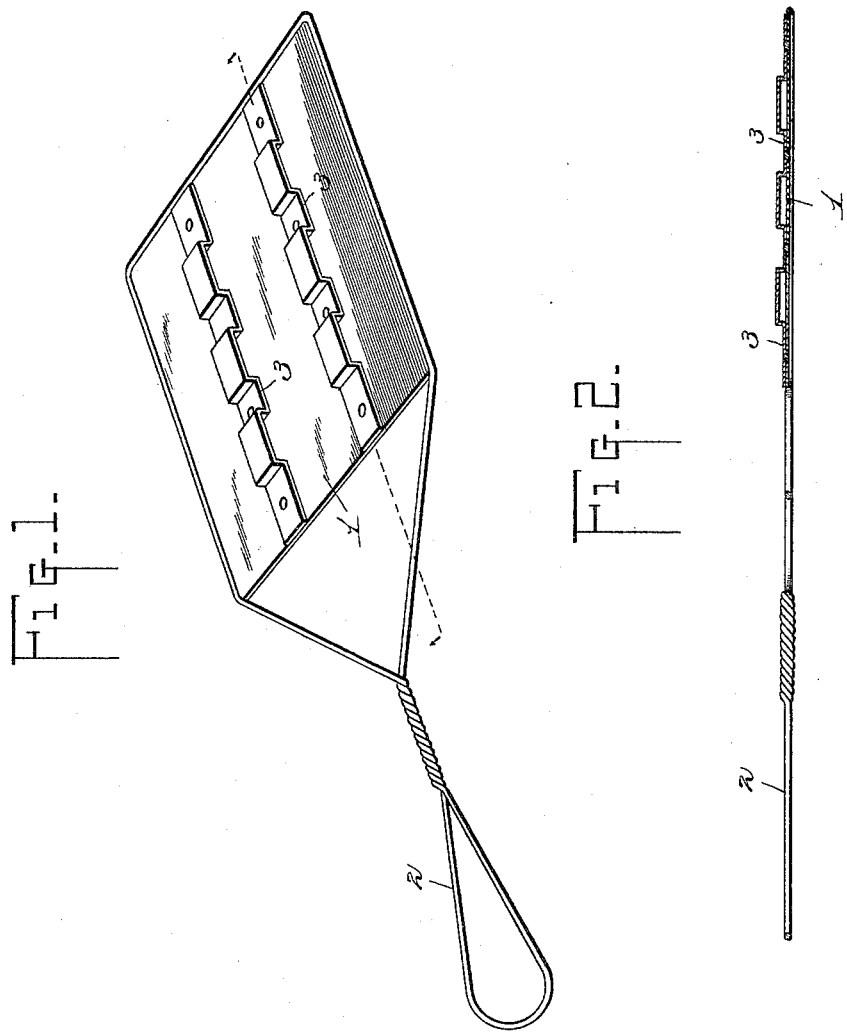
Witnesses
Harry L. Ames.
Victor J. Evans.
Inventor
Elizabeth F. Robertson.
by John Wedderburn.
Attorney

UNITED STATES PATENT OFFICE.

ELIZABETH F. ROBERTSON, OF BRISTOL, FLORIDA.

INSECT-EXTERMINATOR.

SPECIFICATION forming part of Letters Patent No. 599,404, dated February 22, 1898.

Application filed August 5, 1897. Serial No. 647,205. (No model.)

*To all whom it may concern:*

Be it known that I, ELIZABETH F. ROBERTSON, of Bristol, in the county of Liberty and State of Florida, have invented certain new and useful Improvements in Insect-Exterminators; and I do hereby declare the following to be a full, clear, and exact description of the invention, such as will enable others skilled in the art to which it appertains to make and use the same.

This invention relates to improvements in insect-exterminators, and has more particular relation to devices for exterminating flies, which usually infest barns and stables to the annoyance of the animals housed therein.

The invention consists of the combination, with a non-combustible plate having a suitable handle, of a plurality of strips of asbestos mounted in said plate and adapted to be saturated with oil.

The invention also consists of certain other novel constructions, combinations, and arrangements of parts, all of which will be hereinafter more particularly set forth and claimed.

In the accompanying drawings, forming a part of this specification, Figure 1 represents a perspective view of the device embodying my invention, and Fig. 2 represents a central vertical longitudinal section through the same on the line of one of the asbestos strips.

1 in the drawings represents the base-plate, 2 the handle, and 3 3 the asbestos strips. Said plate 1 is preferably constructed of sheet metal, while the handle 2, which is preferably constructed of wire, passes about the sides of the plate 1, being secured thereto in any suitable manner, so as to form a firm and rigid support for the plate to prevent warping of the same because of the unusual heat to which it is exposed.

The strips 3 of asbestos are secured to the surface of the plate 1 at intervals by staples or rivets and in such manner that the portions of the strips lying between the respective rivets will project away from the surface of the plate 1 to permit the air to pass freely under said portions of the strips and greatly assist in the combustion of the oil with which the strips are saturated.

When the invention is to be employed for the extermination of the flies or insects, the whole is first soaked in kerosene or any other good oil. By this means the asbestos strips absorb a considerable quantity of the oil, so that when ignited the oil will burn for an extended period. The device is applied in proximity to the animals preferably at night, so that the insects upon the animals will be awakened or disturbed by the heat and will naturally fly into the blaze and thereby be consumed.

By the peculiar structure of the plate 1 with the asbestos strips extending over the same at intervals an extended sheet of flame is provided which effectually blinds the insects and causes them to fly toward the same to their own destruction. The flat structure of the blazing area also permits of the same being moved into proximity to the animals, so that the heat generated by the device will disturb the insects.

The construction and operation of the device are very simple and cheap, but at the same time very effective, as its continued application will effectually exterminate all the horned flies or other insects infesting the stable or other places occupied by the animals.

The device is particularly applicable to the extermination of horned flies, such as inhabit cow barns or stalls and rest upon the animals almost continuously.

Having thus described my invention, what I claim as new, and desire to secure by Letters Patent, is—

1. The combination with a non-combustible plate having a suitable handle, of a plurality of asbestos strips applied on said plate and adapted to be saturated with oil, substantially as described.

2. The combination with a non-combustible plate having a suitable handle, of a plurality of asbestos strips secured at intervals to said plate so that the intermediate intersected portions will project above the surface of the plate, substantially as described.

3. The combination with a metallic plate, of a wire or rod passed about three sides of the same and formed into a handle, and asbestos strips secured at intervals to said metallic plate so that they may be saturated with oil, substantially as described.

In testimony whereof I have signed this specification in the presence of two subscribing witnesses.

ELIZABETH F. ROBERTSON.

Witnesses:
W. U. ROBERTSON,
W. H. WALKER.